(12) United States Patent
Bell et al.

(10) Patent No.: US 7,333,948 B2
(45) Date of Patent: *Feb. 19, 2008

(54) METHOD AND SYSTEM FOR CROSS-MARKETING PRODUCTS AND SERVICES OVER A DISTRIBUTED COMMUNICATION NETWORK

(76) Inventors: Stuart Bell, 688 N. Wilta Rd., New Canaan, CT (US) 06840; Richard Fernandes, 425 Wellington Dr., Fairfield, CT (US) 06430; Vincent D'Agostino, 90 Myrtle Ave., Westport, CT (US) 06880

( * ) Notice: Subject to any disclaimer, the term of this patent is extended or adjusted under 35 U.S.C. 154(b) by 456 days.

This patent is subject to a terminal disclaimer.

(21) Appl. No.: 10/998,810

(22) Filed: Nov. 30, 2004

(65) Prior Publication Data

US 2005/0075947 A1 Apr. 7, 2005

Related U.S. Application Data

(63) Continuation of application No. 10/428,093, filed on May 2, 2003, now Pat. No. 6,885,995, which is a continuation of application No. 09/267,110, filed on Mar. 12, 1999, now Pat. No. 6,574,606.

(51) Int. Cl.
*G06Q 30/00* (2006.01)
(52) U.S. Cl. ............... 705/26; 705/14; 705/27; 709/217; 715/513; 463/29
(58) Field of Classification Search .............. 705/1, 705/14, 26, 27; 709/217; 715/513; 463/29
See application file for complete search history.

(56) References Cited

U.S. PATENT DOCUMENTS

| | | | |
|---|---|---|---|
| 4,567,359 A | 1/1986 | Lockwood | |
| 5,774,870 A * | 6/1998 | Storey | 705/14 |
| 5,806,045 A | 9/1998 | Biorge et al. | |
| 5,845,256 A | 12/1998 | Pescitelli et al. | |
| 5,870,718 A | 2/1999 | Spector | |
| 5,970,469 A * | 10/1999 | Scroggie et al. | 705/14 |
| 5,992,888 A | 11/1999 | North et al. | |
| 5,999,914 A | 12/1999 | Blinn et al. | |
| 6,009,411 A | 12/1999 | Kepees | |
| 6,009,412 A | 12/1999 | Storey | |
| 6,014,634 A * | 1/2000 | Scroggie et al. | 705/14 |
| 6,014,635 A * | 1/2000 | Harris et al. | 705/14 |
| 6,039,244 A | 3/2000 | Finsterwald | |
| 6,055,513 A * | 4/2000 | Katz et al. | 705/26 |
| 6,061,660 A * | 5/2000 | Eggleston et al. | 705/14 |
| 6,101,485 A | 8/2000 | Fortenberry | |
| 6,141,666 A * | 10/2000 | Tobin | 715/513 |
| 6,173,267 B1 | 1/2001 | Ciarns | |

(Continued)

FOREIGN PATENT DOCUMENTS

WO WO 99/04326 * 1/1999

(Continued)

OTHER PUBLICATIONS

Craig, MacClaren R; "Net Results"; Sep. 1998; extracted from Dialog, Dialog #05840216, File 16.*

(Continued)

*Primary Examiner*—Yogesh C. Garg (57) ABSTRACT

A method and system for cross-marketing products and services to customers of specific merchant web sites on the Internet by a merchant loyalty service provider web site on the Internet, provides a hyperlink to a merchant loyalty service provider web site from a merchant web site whereby customers can access the merchant loyalty service provider web site directly from the merchant web site. The merchant loyalty service provider web site makes to customers of the merchant customer loyalty benefit offers related to the business of said merchant web site, to build customer loyalty to the merchant web site.

27 Claims, 6 Drawing Sheets

U.S. PATENT DOCUMENTS

| | | | |
|---|---|---|---|
| 6,175,823 B1 * | 1/2001 | Van Dusen | 705/26 |
| 6,185,541 B1 * | 2/2001 | Scroggie et al. | 705/14 |
| 6,267,672 B1 | 7/2001 | Vance | |
| 6,292,786 B1 | 9/2001 | Deaton et al. | |
| 6,336,099 B1 | 1/2002 | Barnett et al. | |
| 6,385,591 B1 * | 5/2002 | Mankoff | 705/14 |
| 6,405,174 B1 | 6/2002 | Walker et al. | |
| 6,578,012 B1 * | 6/2003 | Storey | 705/14 |
| 6,584,448 B1 | 6/2003 | Laor | |
| 7,054,830 B1 * | 5/2006 | Eggleston et al. | 705/14 |
| 2002/0198957 A1 | 12/2002 | Amjadi | |

FOREIGN PATENT DOCUMENTS

WO     WO 99/04326 A2     1/1999

OTHER PUBLICATIONS

Botto, Francis, "dictionary of e-business", John Wiley & Sons, Ltd, Copyright 2000, paragraph 2, lines 4-10. p. 132 (available in file wrapper US Pat. 6574606).

Press release from Netcentives Inc. on Sep. 27, 1997 in San Francisco (available in file wrapper US Pat. 6574606).

Press release from Netcentives Inc. on Mar. 23, 1998 in San Francisco (available in file wrapper US Pat. 6574606).

Press release from Netcentives Inc. on Jan. 13, 1999 in San Francisco (attached).

Press release, "ClickRewards offers millions of frequent flyer miles to internet shoppers-free tickets to dream vacations around the world", PR Newswire, NY, Jun. 24, 1998 extracted from Internet http://proquest.umi.com on Nov. 15, 2002 (available in file wrapper US Pat. 6574606).

Press release, "Netcentives and the Knot strike an exclusive deal to reward brides and grooms; the Knot wedding gift registry to offer ClickRewards frequent flyer miles purchases", Business Wire, NY, Nov. 23, 1998 (attached).

Press release, "Hungary wakes up to smart card loyalty programs", Newsbytes News Network, Stillwater, Feb. 20, 1998 (attached).

\* cited by examiner

METHOD AND SYSTEM FOR CROSS-MARKETING PRODUCTS AND SERVICES OVER A DISTRIBUTED COMMUNICATION NETWORK

CROSS-REFERENCE TO RELATED APPLICATION

This application is a continuation of application Ser. No. 10/428,093, filed May 2, 2003 now U.S. Pat. No. 6,885,995, which is a continuation of application Ser. No. 09/267,110 filed Mar. 12, 1999, now U.S. Pat. No. 6,574,606.

BACKGROUND OF THE INVENTION

1. Field of the Invention

The present invention relates generally to methods and systems for conducting commercial transactions over a distributed communication network, such as the Internet, and more specifically, the World Wide Web. More particularly, the present invention relates to a method and system wherein a merchant loyalty service provider furnishes customer loyalty programs to on-line merchants in a manner that is transparent to the merchant's customers.

2. Background and State of the Art

Presently, the primary focus of transaction-based Internet web site companies is on building name or brand recognition, market share, and customer service, as opposed to profit maximization. In many cases prices are set so low that even variable margin contributions are negligible when offset against expenses.

Some analysts believe that profitability ultimately will be achieved either by the realization of increases in volume that are large enough to cover overhead expenses and provide a substantial profit margin, or by eventual reduction in the number of competitors as the markets mature. However, it is likely that Internet-based businesses inevitably will face the same margin pressures as conventional businesses, and thus will need to find additional opportunities to expand margins.

One such opportunity is the development of secondary services such as customer loyalty programs or add-on service programs. Such services enhance profitability by providing increased revenue on each sale. Because of the focus of most transaction-based web site companies on establishing name or brand recognition and building market share, such companies today do not have the resources or ability to devote to the development and delivery of secondary services.

Accordingly, there exists a need in the art for providing customer loyalty programs to on-line merchants in a manner that requires little or no effort on the part of the merchant.

SUMMARY OF THE INVENTION

The present invention provides a solution to the problems and shortcomings in the art as described above, by providing a method for cross-marketing products and services to customers of specific merchant web sites on the Internet by a merchant loyalty service provider web site on the Internet, comprising the steps of providing a hyperlink to the merchant loyalty service provider web site from the merchant web site whereby the customer can access the merchant loyalty service provider web site directly from the merchant web site, providing at the merchant loyalty service provider web site a customer loyalty benefit offer related to the business of the merchant web site, receiving at the merchant loyalty service provider web site an acceptance of the customer loyalty offer by the customer, and providing the customer loyalty benefit to the customer in response to the acceptance.

According to another aspect of the invention, a system is provided which performs the method described above.

BRIEF DESCRIPTION OF THE DRAWINGS

The present invention will become more fully understood from the following detailed description of the preferred embodiments in conjunction with the accompanying drawings, in which.

DETAILED DESCRIPTION OF THE PREFERRED EMBODIMENTS

Figure 1:
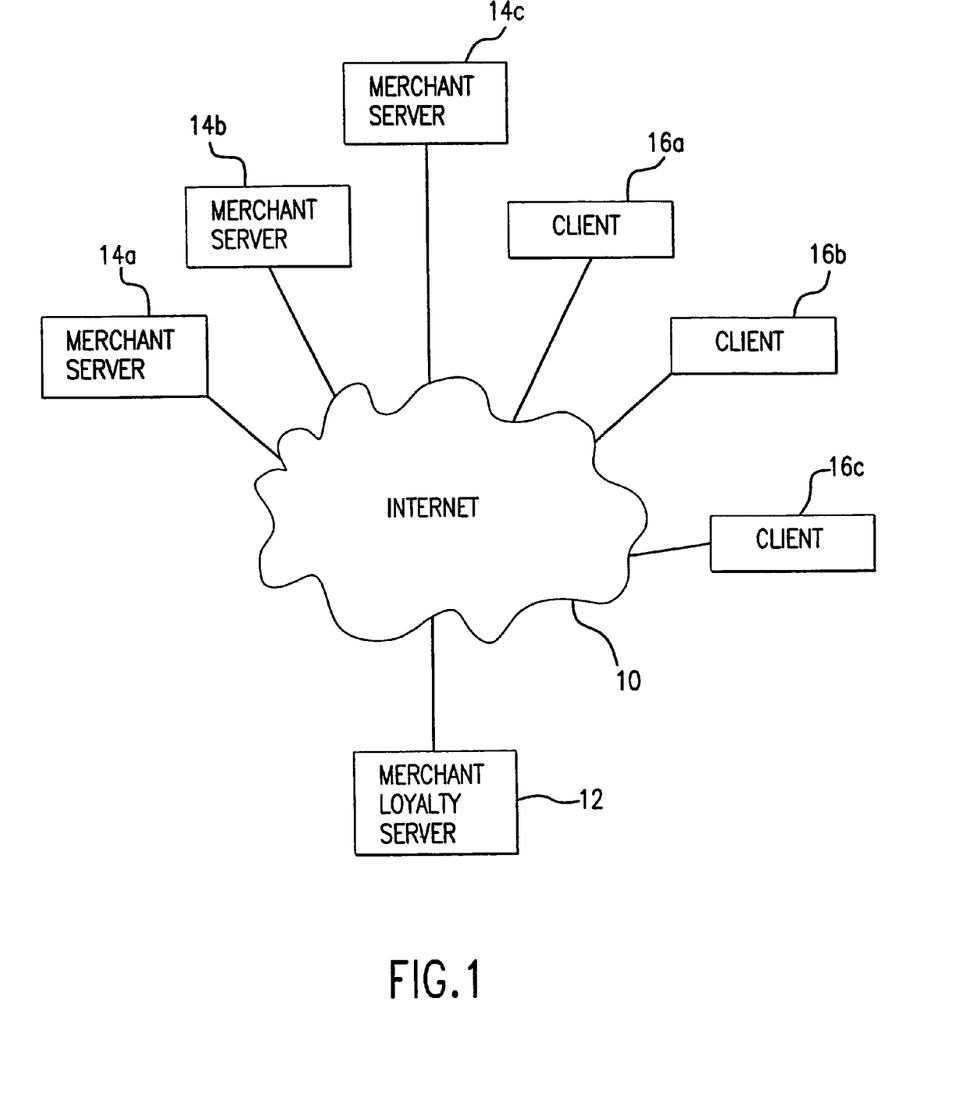
FIG. 1 is a block diagram of a system for providing enhanced secondary services to on-line merchants over a distributed communication network, according to one preferred embodiment of the invention.

FIG. 1 is a block diagram of a system for providing enhanced secondary services to on-line merchants over a distributed communication network 10. According to the preferred embodiment of the invention, the distributed communication network comprises the Internet; however, any type of distributed communication network such as a wide-area network may be used in conjunction with the principles of the invention. For purposes of explanation only, the invention will be hereinafter described in the context of the Internet and the World Wide Web.

As shown in FIG. 1, the invention contemplates a plurality of merchant servers 14a-14c, a plurality of clients 16a-16c, and a merchant loyalty server 12, each operatively connected to the Internet 10 such that each server or client is able to communicate and exchange data with any other server or client. Merchant servers 14a-14c present commercial transaction-based web sites to clients (i.e. customers) 16a-16c who log in or access the merchant servers 14a-14c.

Figure 2:
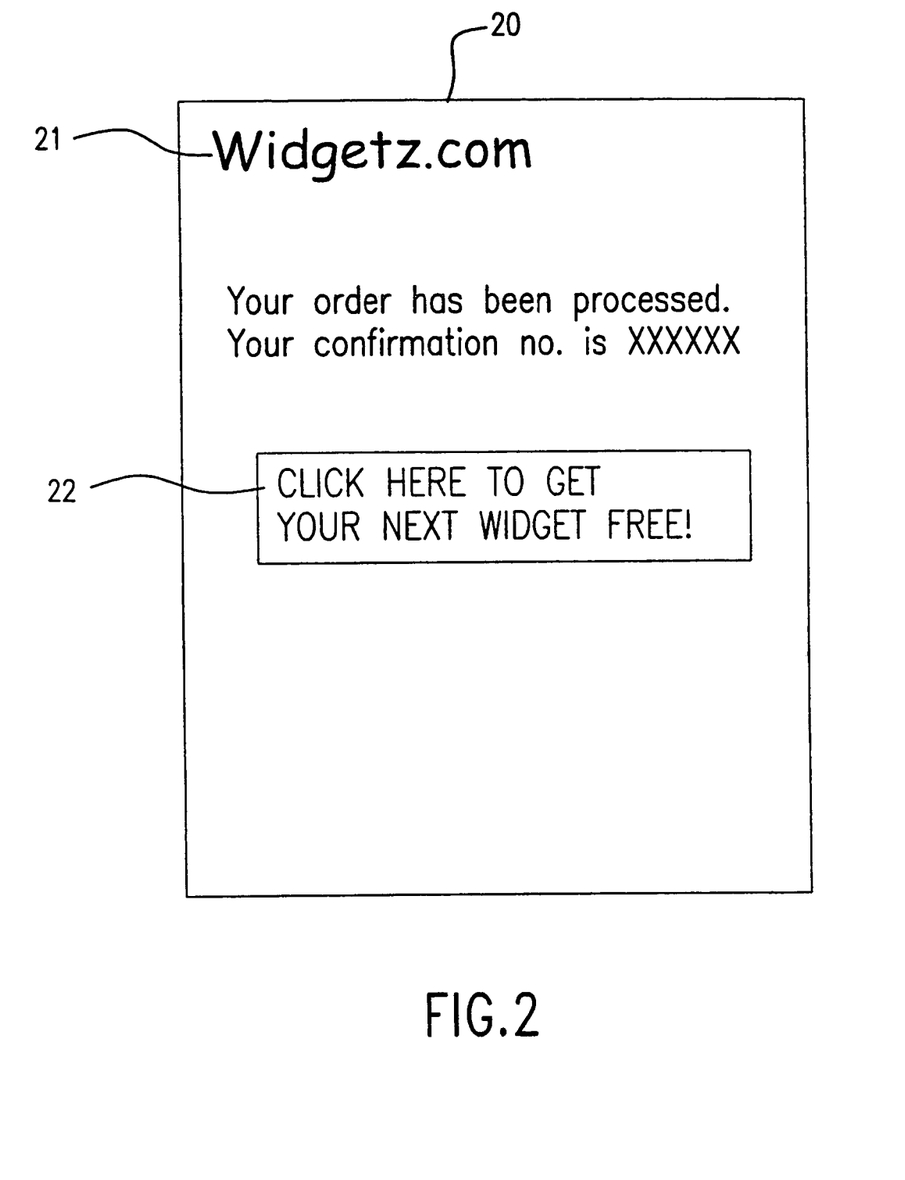
FIG. 2 is a plan view of a merchant web site display according to one preferred embodiment of the invention.

One example of a merchant web site is shown in FIG. 2 as web site 20. For purposes of explanation, a fictional company called Widgetz.com will be used. The merchant's web site typically contains artwork or stylized graphics 21 which identify the site to the customer as coming from the particular merchant. After a customer has entered an on-line order with the merchant, and the merchant has processed the order, typically the merchant will display to the customer a page indicating that the customer's order has been successfully processed and displaying an order confirmation number for the customer to retain if the future need arises to communicate with the merchant regarding the order.

According to a preferred embodiment of the invention, a banner ad 22 is placed on the order confirmation page. The banner ad will offer the customer a loyalty benefit, such as the opportunity to receive her next widget free. Alternatively, depending on the nature of the merchant's business, the offer may be for free shipping, a percentage or specific dollar amount discount, enhanced warranties, or free accidental death insurance, traveler's insurance, or term life insurance. FIG. 2 illustrates an example of an offer for a free widget for purposes of illustration. Additionally, instead of a banner ad, text 22 may be code or hypertext as is well known in the art.

Figure 3:
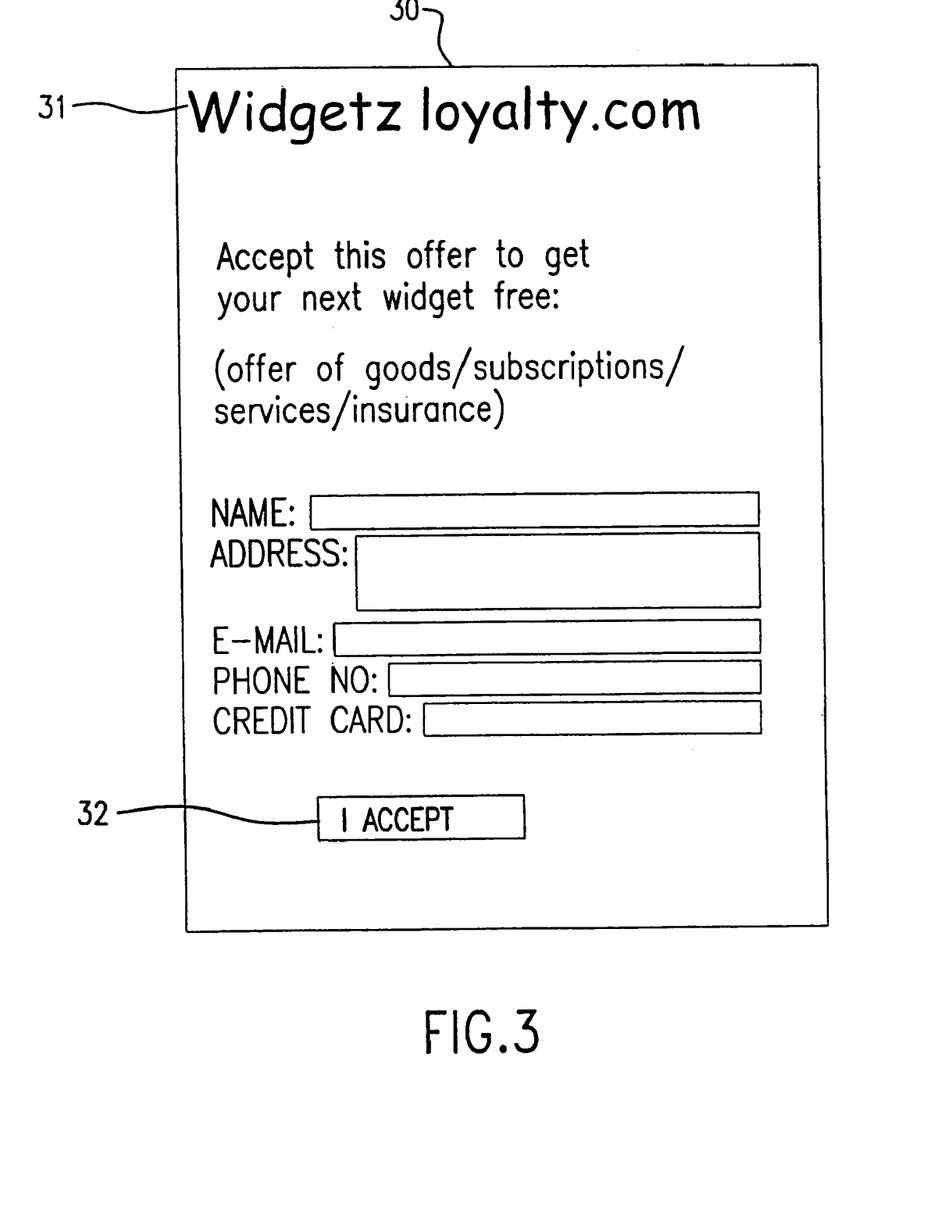
FIG. 3 is a plan view of a loyalty web site display according to one preferred embodiment of the invention.

When the customer clicks on the offer 22, the customer is brought to a merchant loyalty site 30 as shown in FIG. 3. Loyalty site 30 is actually located on merchant loyalty server 12; however, the site graphics 31 are made to have the same "look and feel" as the merchant's web site (this would be accomplished by prior contractual arrangement between the merchant and the merchant loyalty service provider). As such, the customer would perceive that she is still within the merchant's own web site.

The loyalty web site would present an offer to the customer, for example, for products such as cellular telephones, pagers, credit cards, magazines, insurance, or services such as memberships, extended warranties, and the like. These products would be offered either as a special benefit to the merchant's customer available at bargain prices, or as a free or "thank you" benefit to the loyal customer of the merchant's web site.

Figure 4:
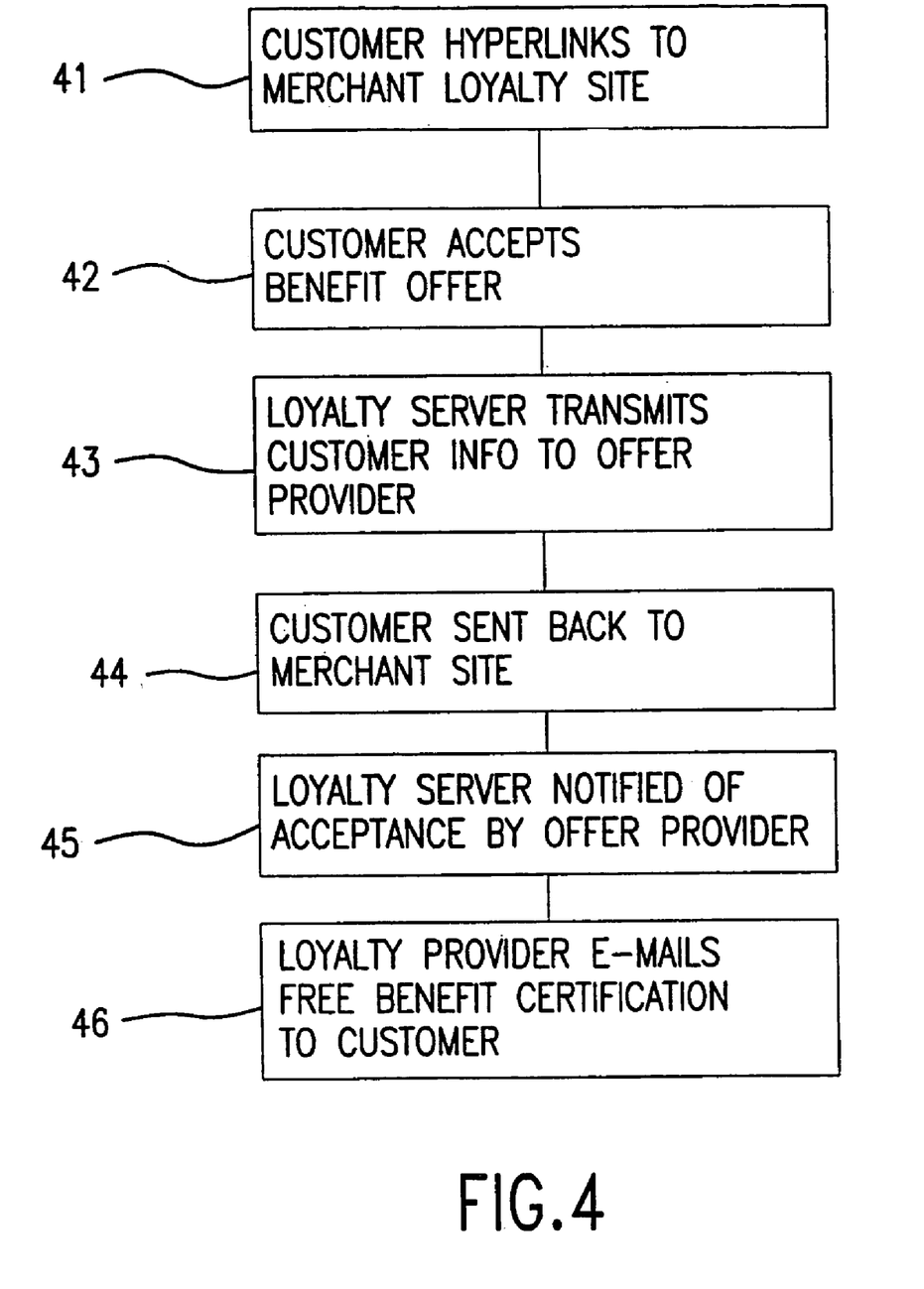
FIG. 4 is a process flow diagram illustrating an example procedure for providing customer loyalty benefits according to the invention.

In the case of product offers, the customer will be offered the opportunity to receive a gift certificate, next product free, or free shipping as an added incentive for the customer to accept the offer. In the case of the "thank you" benefit, such as free insurance or warranty, the customer would be encouraged to buy an upgrade to the insurance or warranty provided as the free benefit. As shown in FIG. 3, the loyalty web page would contain fields for the customer to enter her personal information, including her e-mail address and phone number, as well as credit card information. When the customer has completed entry of the required information, she would click on an icon or hyperlink 32 indicating her acceptance of the offer. One example of a process whereby a customer accepts a loyalty offer is illustrated in FIG. 4.

At step 41, the customer at the merchant site 20 clicks on the banner ad or hypertext 22 and is brought to the merchant loyalty web site 30. At step 42, the customer accepts the benefit offer (after entering the required information) by clicking on the acceptance icon or hypertext 32. At step 43, once the merchant loyalty server 12 receives the information from the customer, the loyalty server transmits the customer information to the offer provider. For example, in the case of a wireless telephone, the loyalty server would transmit the customer's information to the wireless or cellular telephone provider or manufacturer for processing. At step 44, the customer would be sent back to the merchant's web site 20 after completion of the benefit application.

After processing by the offer provider and acceptance of the customer's application, at step 45 the provider notifies the loyalty server that the customer's application has been accepted. In response, at step 46 the loyalty server would send a free benefit or gift certificate to the customer for redemption, such as by e-mail. The e-mail also may contain a hypertext link to the merchant's web site. Of course, the certificate may be sent to the customer by any mode of communication, such as mail or facsimile, or by communication to the customer when the customer logs on to the merchant web site using a unique customer account or identification number.

Figure 5:
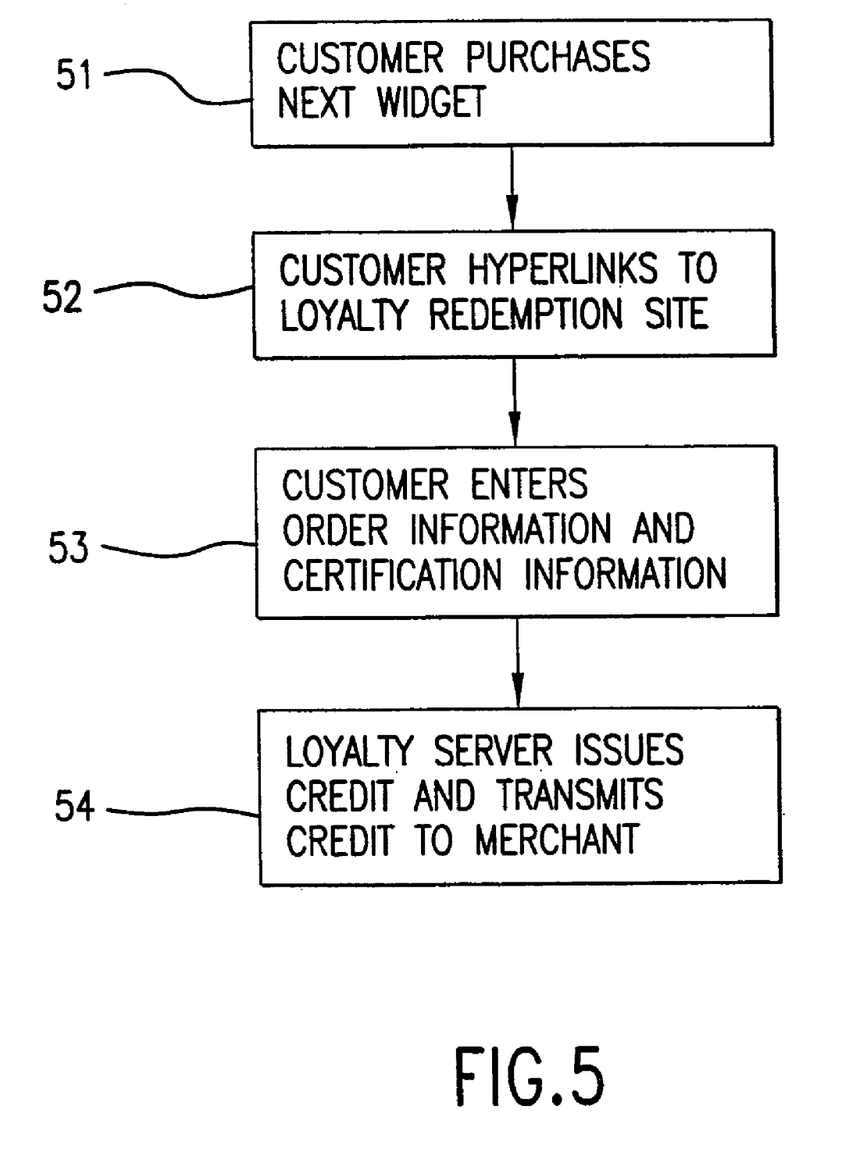
FIG. 5 is a process flow diagram illustrating an example procedure for redeeming customer loyalty benefits according to the invention.

FIG. 5 illustrates one example of a process whereby the customer redeems the certificate. At step 51, the customer logs on to the merchant's web site to purchase her next widget, and receives an order confirmation. At step 52, the customer hyperlinks to a merchant loyalty redemption web page serviced by the loyalty server 12. The redemption web page would be accessed in the same manner as the loyalty offer web page described above.

At step 53, the customer would enter her order confirmation information and gift certificate information on the loyalty redemption web page. The loyalty server verifies the entered information, and then issues a credit on behalf of the customer and transmits the credit to the merchant's server at step 54. The merchant then applies the credit to the customer's order. Such credit, for example, could be for a free widget, a discount, or for free shipping, as the case may be.

Alternatively, the certificate information may be passed to the merchant server automatically by the loyalty server. In this case, the customer would be given the option of redeeming the certificate upon entering an order.

Figure 6:
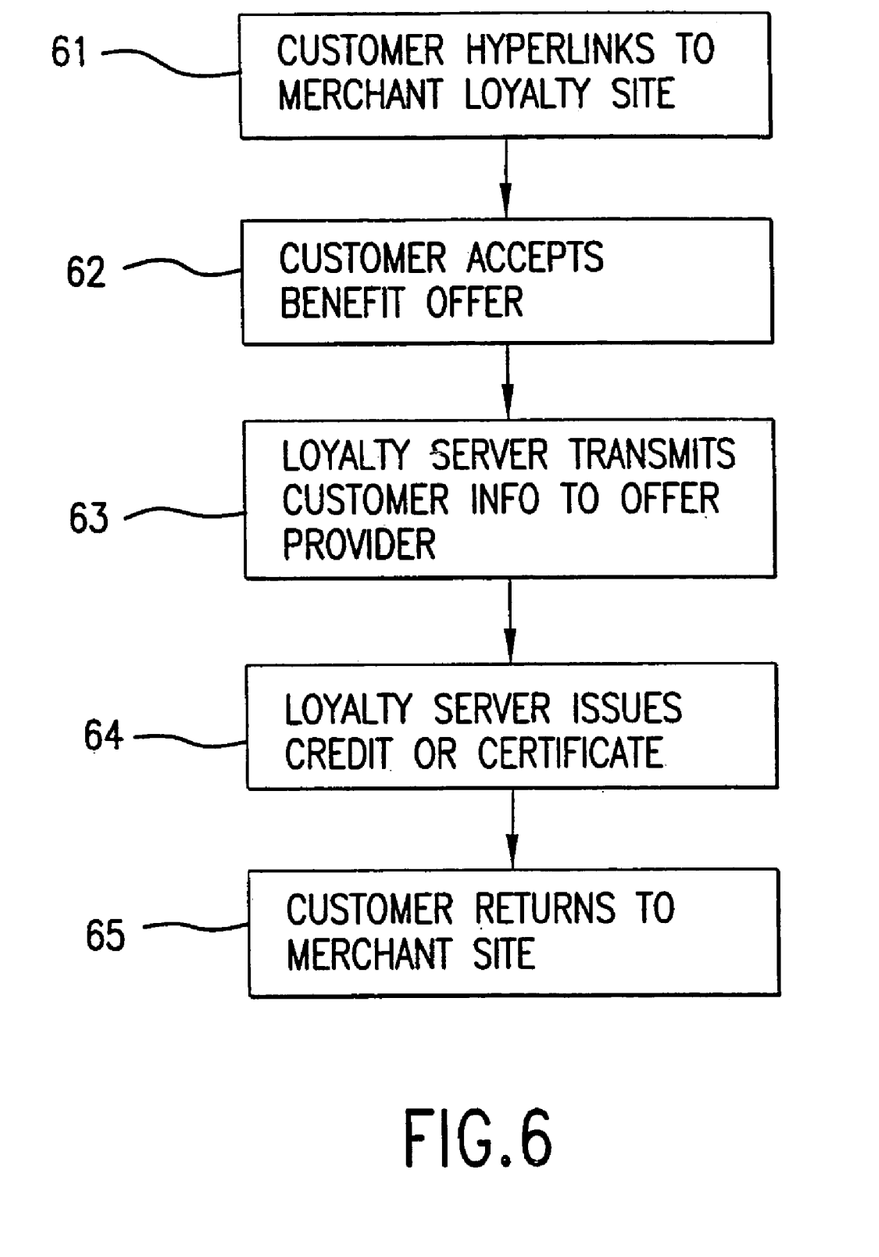
FIG. 6 is a is a process flow diagram illustrating an example procedure for providing and redeeming customer loyalty benefits according to an alternate embodiment of the invention.

FIG. 6 illustrates an example of a circumstance wherein no acceptance of a customer application by the offer provider is required. Under such circumstances, the offer provider will automatically compensate the merchant loyalty service provider for each new customer referral, and as such no acceptance confirmation would be needed for the free benefit to be applied. At step 61, the customer would hyperlink from the merchant's web site 20 to the merchant loyalty web site 30, as described above, where the customer would be presented with the benefit offer. At step 62, the customer would accept the offer, as explained above. The loyalty server at step 63 would then transmit the customer information to the offer provider, and at step 64 would immediately issue a credit or certificate to the customer, either by displaying the certificate to the customer, or by sending the certificate information to the merchant's web site. At step 65, the customer is then returned to the merchant's web site. At the merchant's web site, the customer would be given the option of applying the certificate to her next order.

The procedure of FIG. 6 also is applicable to those situations where a "thank you" or free benefit is automatically provided to the customer, with the opportunity for the customer to purchase an upgrade, as in the case of insurance or extended warranties. If the customer accepts the free or "thank you" benefit but does not want to purchase an upgrade, the customer will not enter credit card information but will be immediately returned to the merchant's web site.

In the case of insurance as a benefit, a customer would be offered a certain amount of free insurance while she is on a client web site. Once registered for this insurance, the customer will be offered an upgrade to a higher amount of insurance, or potentially a different type of insurance. In the case of either the free insurance or the upgraded insurance, insurance regulations require that the customer be provided with a certificate of insurance or policy for the provided coverage. According to the present invention, the certificate of insurance or policy is delivered to the customer electronically over the Internet in a secure fashion, with an option for the customer to select conventional fulfillment through the mail.

The invention having been described, it will be apparent to those skilled in the art that the same may be varied in many ways without departing from the spirit and scope of the invention. Any and all such modifications are intended to be included in the scope of the following claims.

What is claimed is:

1. A method for cross-marketing a specific product and/or service to a customer of a merchant over a distributed communication network by a merchant loyalty service provider hosting site, comprising:

providing a selectable connection to said merchant loyalty service provider hosting site on said network from a merchant site on said network whereby a customer can access said merchant loyalty service provider hosting site through said merchant site;

providing at said merchant loyalty service provider hosting site a customer loyalty benefit offer, wherein said customer loyalty benefit offer presents to a customer an offer for said specific product and/or service, and a benefit award to a customer as an incentive to accept said offer of said specific product and/or service, wherein said benefit award is redeemable as a result of activity at said merchant site by the customer who accessed said merchant loyalty service provider hosting site;

receiving at said merchant loyalty service provider hosting site an acceptance of said customer loyalty offer by the customer; and providing said customer loyalty benefit award to the customer in response to said acceptance.

2. The method of claim 1, wherein a customer is required to make a purchase of said specific products and/or services presented by said offer in order to receive said customer loyalty benefit award.

3. The method of claim 1, wherein said customer loyalty benefit award is redeemable upon a customer's next order.

4. The method of claim 1, wherein said customer loyalty benefit award is redeemable upon a subsequent order by the customer.

5. The method of claim 1, wherein said merchant loyalty service provider hosting site is transparent to a customer.

6. The method of claim 5, wherein said merchant loyalty service provider hosting site comprises graphics which make said merchant loyalty service provider hosting site appear similar to the merchant site from which a customer accessed said merchant loyalty service provider hosting site.

7. The method of claim 1, wherein providing said customer loyalty benefit award comprises sending to the customer at least one of a gift certificate, check, voucher, discount certificate, discount code, policy certificate, code and coupon.

8. The method of claim 7, wherein said customer loyalty benefit award is sent via mail, electronic mail or facsimile.

9. The method of claim 1, wherein providing said customer loyalty benefit award comprises providing an amount of insurance coverage for the customer, and sending to the customer a certificate of insurance.

10. A method for cross-marketing a specific product and/or service to a customer of a merchant on the Internet by a merchant loyalty service provider hosting web site, comprising:

providing a selectable connection to said merchant loyalty service provider hosting web site on the Internet from a merchant web site on the Internet whereby a customer can access said merchant loyalty service provider hosting web site through said merchant web site;

providing at said merchant loyalty service provider hosting web site a customer loyalty benefit offer that presents to a customer an offer for said specific product and/or service, and a benefit award to a customer as an incentive to accept said offer of said specific product and/or service, wherein said benefit award is redeemable as a result of activity at said merchant web site by the customer who accessed said merchant loyalty service provider hosting web site;

receiving at said merchant loyalty service provider hosting web site an acceptance of said customer loyalty offer by the customer; and providing said customer loyalty benefit award to the customer in response to said acceptance.

11. The method of claim 10, wherein a customer is required to make a purchase of said specific products and/or services presented by said offer in order to receive said customer loyalty benefit award.

12. The method of claim 10, wherein said customer loyalty benefit award is redeemable upon a customer's next order.

13. The method of claim 10, wherein said customer loyalty benefit award is redeemable upon a subsequent order by the customer.

14. The method of claim 10, wherein said merchant loyalty service provider hosting web site is transparent to a customer.

15. The method of claim 14, wherein said merchant loyalty service provider hosting web site comprises graphics which make said merchant loyalty service provider hosting web site appear similar to the merchant web site from which a customer accessed said merchant loyalty service provider hosting web site.

16. The method of claim 10, wherein providing said customer loyalty benefit award comprises sending to the customer at least one of a gift certificate, check, voucher, discount certificate, discount code, policy certificate, code and coupon.

17. The method of claim 16, wherein said customer loyalty benefit award is sent via mail, electronic mail or facsimile.

18. The method of claim 10, wherein providing said customer loyalty benefit award comprises providing an amount of insurance coverage for the customer, and sending to the customer a certificate of insurance.

19. A method for cross-marketing a specific product and/or service to a customer of a merchant over a distributed communication network by a merchant loyalty service provider hosting site, comprising:

providing a selectable connection to said merchant loyalty service provider hosting site on said network from one or more merchant sites on said network whereby a customer can access said merchant loyalty service provider hosting site through said one or more merchant sites;

providing at said merchant loyalty service provider hosting site a customer loyalty benefit offer, wherein said customer loyalty benefit offer presents to a customer an offer for said specific product and/or service, and a benefit award to a customer as an incentive to accept said offer of said specific product and/or service, wherein said benefit award is redeemable at any of one or more merchant sites and/or redeemable as a result of activity by the customer who accessed said merchant loyalty service provider hosting site;

receiving at said merchant loyalty service provider an acceptance of said customer loyalty benefit offer by the customer; and providing said customer loyalty benefit award to the customer in response to said acceptance.

20. The method of claim 19, wherein said customer loyalty benefit award is redeemable upon a customer's initial, next or subsequent order.

21. The method of claim 19, wherein said customer loyalty benefit award is at least one of a gift certificate, check, voucher, discount certificate, discount code, policy certificate, code and coupon.

22. A system for cross-marketing a specific product and/or service to a customer of a merchant over a distributed communication network, comprising:

a merchant loyalty service provider hosting server operatively connected to said network, wherein said merchant loyalty service provider hosting server is accessible via a selectable connection from a merchant site whereby a customer can access said merchant loyalty service provider hosting server through said merchant site;

said merchant loyalty service provider hosting server comprising a customer loyalty benefit offer, said customer loyalty benefit offer being presented to a customer accessing said merchant loyalty service provider hosting server through said merchant site, wherein said customer loyalty benefit offer presents to a customer an offer for said specific product and/or service, and a benefit award to a customer as an incentive to accept said offer of said specific product and/or service, wherein said benefit award is redeemable as a result of activity by the customer who accessed said merchant loyalty service provider hosting server;

said merchant loyalty service provider hosting server receiving an acceptance of said customer loyalty benefit offer by the customer; and said merchant loyalty service provider hosting server providing said customer loyalty benefit award to the customer in response to said acceptance.

23. The system of claim 22, wherein said network is the Internet.

24. A system for cross-marketing a specific product and/or service to a customer of a merchant over a distributed communication network, comprising one or more merchant servers including a communication server module for communication over said network;

one or more client-user devices including a client application module for communication over said network, said client application module interfaces with said communication server module over said network;

a merchant loyalty service provider hosting server operatively connected to said network, wherein said client-user device accesses said merchant loyalty service provider hosting server via said merchant server;

said merchant loyalty service provider hosting server further comprising a customer loyalty benefit offer, said customer loyalty benefit offer being presented at said client-user device accessing said merchant loyalty service provider hosting server via said merchant server, wherein said customer loyalty benefit offer presents to a customer an offer for said specific product and/or service, and a benefit award to a customer as an incentive to accept said offer of said specific product and/or service, wherein said benefit award is redeemable at any of said one or more merchant servers and/or redeemable as a result of activity by said customer that accessed said merchant loyalty service provider hosting server;

said merchant loyalty service provider hosting server receiving an acceptance of said customer loyalty benefit offer from said client-user device; and said merchant loyalty service provider hosting server providing said customer loyalty benefit award to a customer in response to said acceptance.

25. The system of claim 24, wherein said network is the Internet.

26. The system of claim 24, wherein said customer loyalty benefit award is redeemable upon a customer's initial, next or subsequent order.

27. The system of claim 24, wherein said customer loyalty benefit award is at least one of a gift certificate, check, voucher, discount certificate, discount code, policy certificate, code and coupon.

* * * * *